(12) United States Patent
Ohmori et al.

(10) Patent No.: US 10,629,937 B2
(45) Date of Patent: Apr. 21, 2020

(54) FUEL CELL SEPARATOR MEMBER AND FUEL CELL STACK

(71) Applicant: HONDA MOTOR CO., LTD., Minato-ku, Tokyo (JP)

(72) Inventors: Suguru Ohmori, Wako (JP); Naoki Yamano, Wako (JP); Shuhei Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 16/005,732

(22) Filed: Jun. 12, 2018

(65) Prior Publication Data

US 2018/0366762 A1 Dec. 20, 2018

(30) Foreign Application Priority Data

Jun. 15, 2017 (JP) .................................. 2017-117749

(51) Int. Cl.
| | | |
|---|---|---|
| *H01M 8/0247* | (2016.01) | |
| *H01M 8/241* | (2016.01) | |
| *H01M 8/2475* | (2016.01) | |
| *H01M 8/248* | (2016.01) | |
| *H01M 8/1018* | (2016.01) | |

(52) U.S. Cl.
CPC ....... *H01M 8/2475* (2013.01); *H01M 8/0247* (2013.01); *H01M 8/248* (2013.01); *H01M 8/241* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

2003/0162080 A1* 8/2003 DeAngelis .......... H01M 8/0247
429/465
2016/0226092 A1 8/2016 Nishiyama et al.

FOREIGN PATENT DOCUMENTS

| JP | 2014-170667 | 9/2014 |
| JP | 2016-143545 | 8/2016 |

OTHER PUBLICATIONS

JP2014170667A—Machine translation (Year: 2014).*
Japanese Office Action for Japanese Patent Application No. 2017-117749 dated Feb. 5, 2019.

* cited by examiner

*Primary Examiner* — Haroon S. Sheikh
(74) *Attorney, Agent, or Firm* — Amin, Turocy & Watson, LLP

(57) ABSTRACT

A separator member of a fuel cell stack includes a load receiver in a form of a plate. The load receiver is joined to a first separator in a manner that the load receiver protrudes outward from an outer peripheral portion of the first separator. The load receiver is formed asymmetrically about a central line passing through the center of the load receiver in the width direction and extending in the protruding direction of the load receiver.

11 Claims, 9 Drawing Sheets

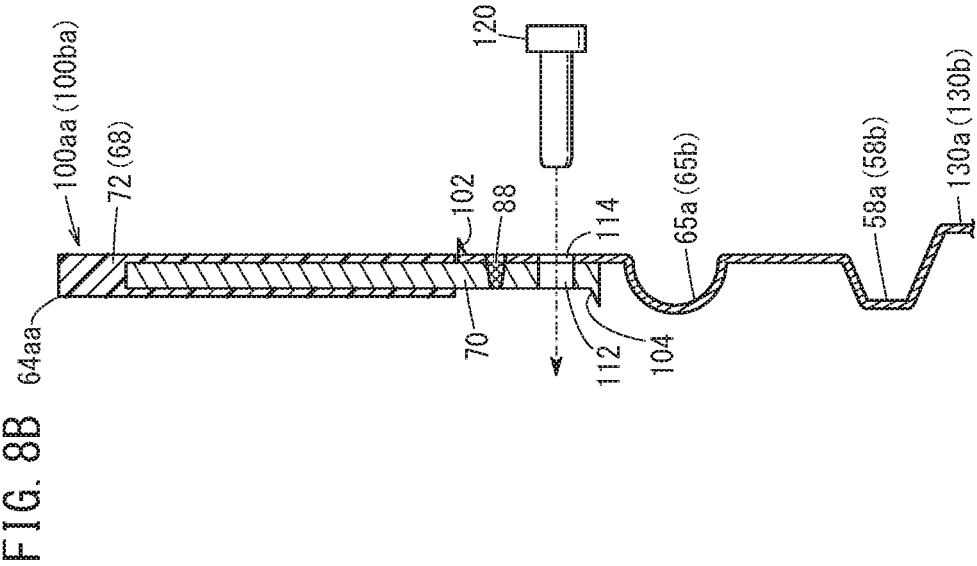
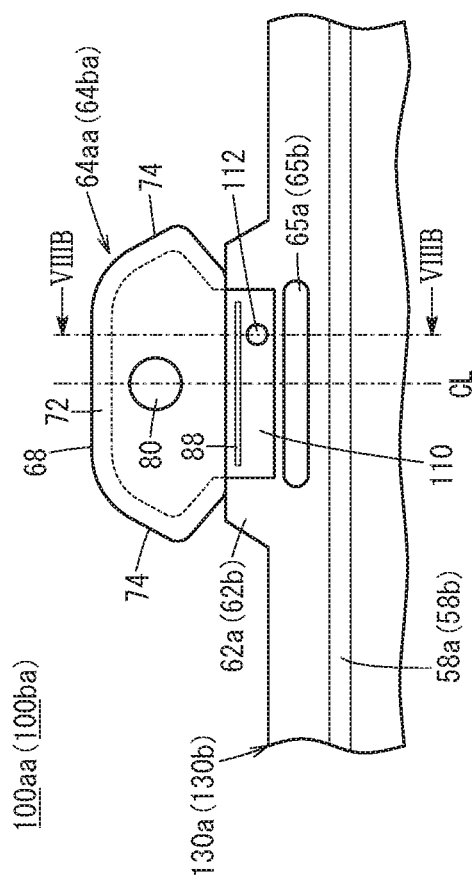

FUEL CELL SEPARATOR MEMBER AND FUEL CELL STACK

CROSS-REFERENCE TO RELATED APPLICATION

This application is based upon and claims the benefit of priority from Japanese Patent Application No. 2017-117749 filed on Jun. 15, 2017, the contents of which are incorporated herein by reference.

BACKGROUND OF THE INVENTION

Field of the Invention

The present invention relates to a fuel cell separator member including a separator forming a unit cell of a fuel cell stack, and a load receiver in a form of a plate joined to the separator in a manner that the load receiver protrudes outward from an outer peripheral portion of the separator. Further, the present invention relates to the fuel cell stack.

Description of the Related Art

For example, a solid polymer electrolyte fuel cell includes a unit cell (power generation cell). The unit cell is formed by sandwiching a membrane electrode assembly (MEA) between separators. The membrane electrode assembly includes an electrolyte membrane, and an anode and a cathode on both sides of the electrolyte membrane. The electrolyte membrane is a polymer ion exchange membrane. In use, normally, a predetermined number of the unit cells are stacked and tightened together to form, e.g., an in-vehicle fuel cell stack.

In this type of the fuel cell stack, an impact load may be applied to the fuel cell stack from the outside. In such a situation, the unit cells move easily in a direction (in which no tightening load is applied) perpendicular to a direction in which the unit cells are stacked together (hereinafter also referred to as the stacking direction).

For example, in Japanese Laid-Open Patent Publication No. 2016-143545, a fuel cell stack which can suppress such movement is proposed. In this fuel cell stack, a load receiver is provided in the form of a plate is provided in a separator in a manner that the load receiver protrudes outward from an outer peripheral portion of the separator. The load receiver is brought into contact with a coupling member which couples a pair of end plates in a manner that the load receiver can receive a load in a direction perpendicular to the stacking direction of the unit cells.

SUMMARY OF THE INVENTION

In the above fuel cell stack, in some case, a load receiver in the form of a plate is formed by press forming, and the load receiver is overlapped with an outer end of the separator, and the load receiver and the separator are joined (welded) together. In such cases, burrs may be formed on one surface of the load receiver as a result of press forming. Therefore, at the time of joining the load receiver to the separator, the load receiver needs to be positioned on the separator (overlapped with the separator) in a manner that a surface of the load receiver having no burrs is brought into contact with a surface of the separator.

However, if the load receiver is formed symmetrically about the central line in the width direction of the load receiver, it is not easy to recognize whether the surface of the load receiver having no burrs contacts the surface of the separator. Therefore, there is a concern that the load receiver is erroneously assembled to the separator.

The present invention has been made taking the above problems into account, and an object of the present invention is to provide a fuel cell separator and a fuel cell stack which make it possible to prevent erroneous assembling of a load receiver to a separator easily.

In order to achieve the above object, a fuel cell separator member according to the present invention includes a separator forming a unit cell of a fuel cell stack, a load receiver in a form of a plate joined to the separator in a manner that the load receiver protrudes outward from an outer peripheral portion of the separator. A width direction of the load receiver is a direction perpendicular to a protruding direction of the load receiver in which the load receiver protrudes from the outer peripheral portion of the separator and perpendicular to a stacking direction. The load receiver is formed asymmetrically about a central line passing through a center of the load receiver in the width direction and extending in the protruding direction of the load receiver.

In the above fuel cell separator member, a first hole may be formed in the load receiver, at a position shifted from the central line toward one side in the width direction, and a second hole may be formed in the separator and the second hole may be configured to be connected to the first hole in a state where the load receiver is joined to the separator.

In the above fuel cell separator member, a first engagement portion may be provided in the load receiver at a position shifted from the central line toward one side in the width direction, and a second engagement portion may be provided in the separator and the second engagement portion may be configured to be engaged with the first engagement portion in a state where the load receiver is joined to the separator.

In the above fuel cell separator member, the first engagement portion may be a cutout, and the second engagement portion may be a projection inserted into the cutout.

In the fuel cell separator member, a rib protruding in the stacking direction may be provided in the separator, adjacent to a joint portion between the load receiver and the separator, and the projection may extend from the rib.

In the fuel cell separator member, a protrusion of the load receiver protruding outward from an outer peripheral portion of the separator may be formed symmetrically about the central line.

In the fuel cell separator member, a burr protruding on a side opposite from the separator may be formed in the load receiver.

In the fuel cell separator member, the load receiver may include an attachment portion joined to the separator at a position overlapped with the separator in the stacking direction, and the cutout may be provided in the attachment portion.

In the fuel cell separator member, outer periphery of the separator may partially protrude outward to form a support portion, and the attachment portion may be joined to the support portion.

In the fuel cell separator member, the joint portion may extend in the width direction, and the rib may extend along the joint portion.

A fuel cell stack according to the present invention includes a plurality of unit cells stacked in a stacking direction each having the above fuel cell separator member.

In the present invention, since the load receiver is asymmetrical about the central line in the width direction, for example, in the case where the load receiver is formed by press forming, it is possible to easily recognize whether or not the surface of the load receiver having no burrs contacts the surface of the separator easily. Therefore, it is possible to prevent erroneous assembling of the load receiver to the separator easily.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8A is a plan view with partial omission, illustrating a fuel cell separator member according to a modified embodiment;

FIG. 8B is a cross sectional view taken along a line VIIIB-VIIIB in FIG. 8A.

DESCRIPTION OF THE PREFERRED EMBODIMENTS

Hereinafter, preferred embodiments of a fuel cell separator member and a fuel cell stack according to the present invention will be described with reference to the accompanying drawings.

Figure 1:
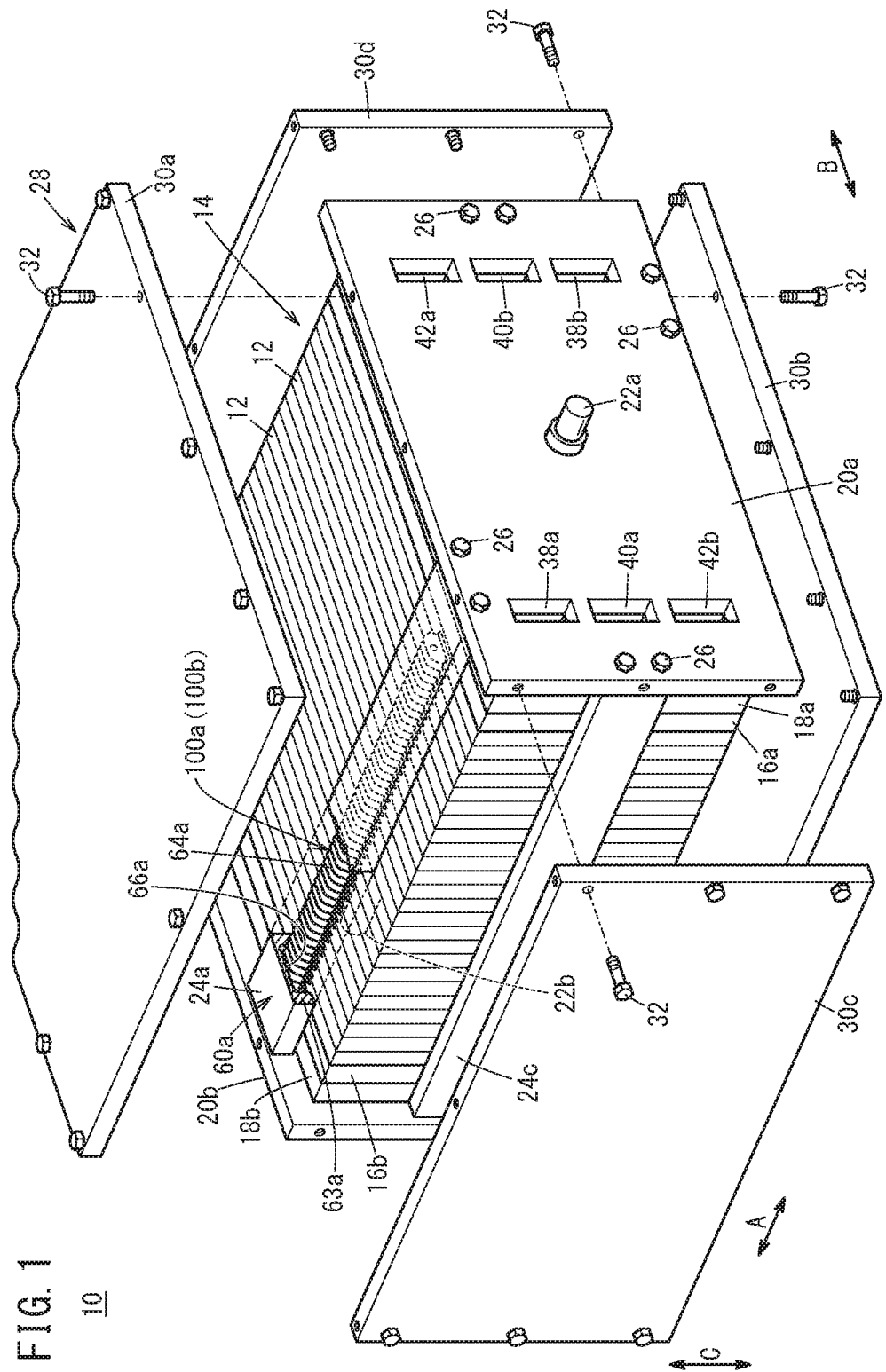
FIG. 1 is a partial exploded perspective view showing a fuel cell stack having a fuel cell separator member according to one embodiment of the present invention.

As shown in FIG. 1, a fuel cell stack 10 according to an embodiment of the present invention includes a stack body 14 formed by stacking a plurality of unit cells 12 together in a stacking direction. For example, the fuel cell stack 10 is mounted in a fuel cell automobile in a manner that the stacking direction (indicated by an arrow A) of the plurality of unit cells 12 is oriented in a horizontal direction (vehicle width direction or vehicle length direction) of the fuel cell automobile. It should be noted that the fuel cell stack 10 may be mounted in a fuel cell automobile in a manner that the stacking direction of the plurality of unit cells 12 is oriented in a vertical direction (vehicle height direction) of the fuel cell automobile.

At one end of the stack body 14 in the stacking direction indicated by the arrow A, a terminal plate 16a is provided. An insulating plate 18a is provided outside the terminal plate 16a, and an end plate 20a is provided outside the insulating plate 18a. At another end of the stack body 14 in the stacking direction, a terminal plate 16b is provided. An insulating plate 18b is provided outside terminal plate 16b, and an end plate 20b is provided outside the insulating plate 18b. That is, the pair of end plates 20a, 20b are provided at both ends of the plurality of unit cells 12 in the stacking direction. An output terminal 22a extends from the central portion of the end plate 20a, and is connected to the terminal plate 16a. An output terminal 22b extends from the central portion of the end plate 20b, and is connected to the terminal plate 16b.

Figure 2:
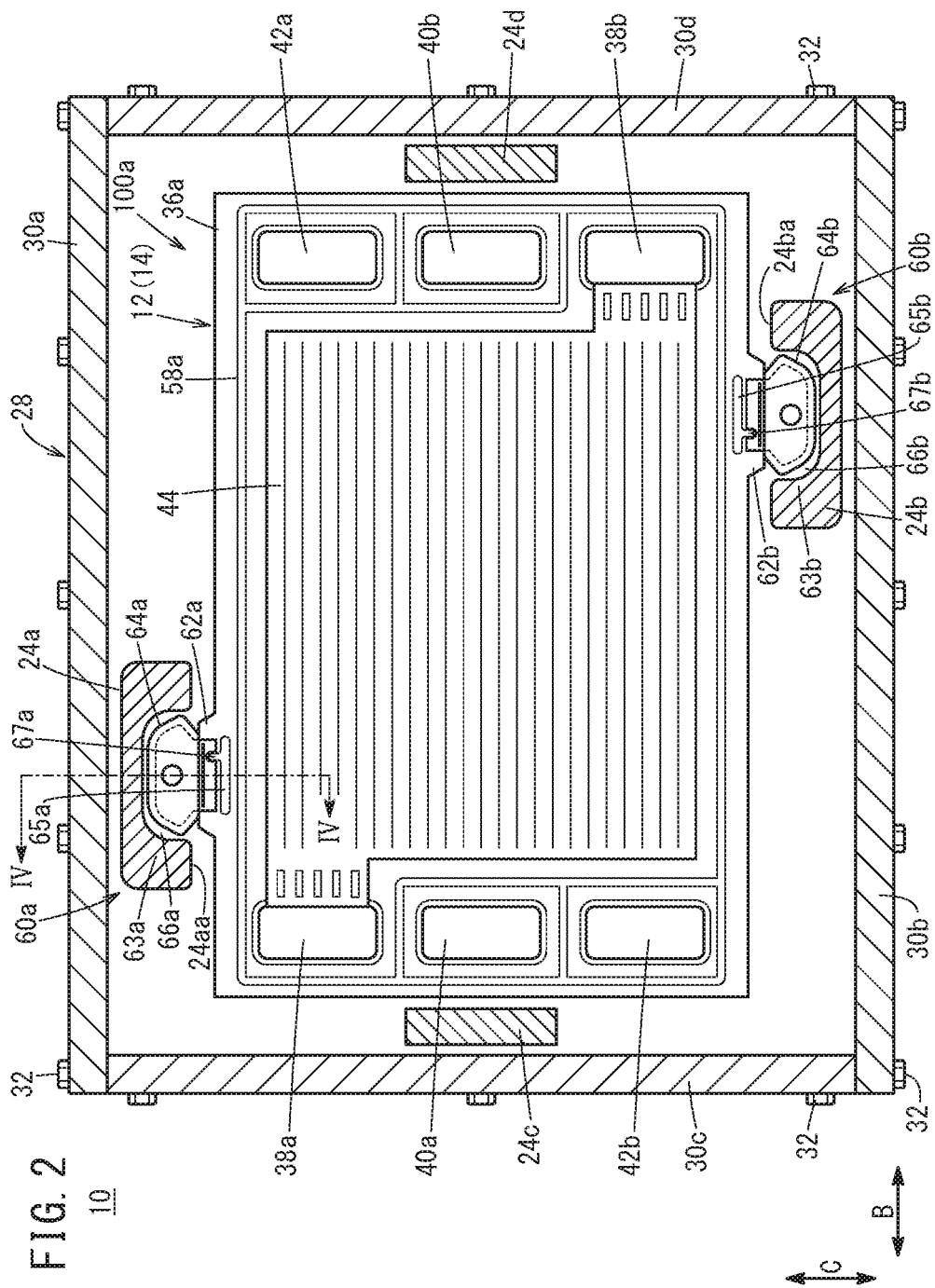
FIG. 2 is a lateral cross sectional view schematically showing a fuel cell stack in FIG. 1.

Each of the end plates 20a, 20b has a laterally elongated rectangular shape. As shown in FIGS. 1 and 2, coupling members 24a to 24d (coupling bars) are provided at intermediate positions of respective sides of the end plates 20a, 20b. Both ends of each of the coupling members 24a to 24d are fixed to inner surfaces of the end plates 20a, 20b using bolts 26 (see FIG. 1). In the structure, the coupling members 24a to 24d apply a tightening load in the stacking direction indicated by the arrow A to the stack body 14. The coupling member 24a is shifted from the center of one of the long sides of the end plates 20a, 20b toward one end side. The coupling member 24b is shifted from the center of another of the long sides of the end plates 20a, 20b toward another end side. The coupling members 24c, 24d are provided at the center of each of the short sides of the end plates 20a, 20b.

The fuel cell stack 10 includes a cover 28 covering the stack body 14 from a direction perpendicular to the stacking direction. The cover 28 includes a pair of side panels 30a, 30b, and a pair of side panels 30c, 30d. Each of the side panels 30a, 30b has a laterally elongated plate shape, and form two surfaces at both ends of the end plates 20a, 20b in a lateral direction indicated by an arrow C. Each of the side panels 30c, 30d has a laterally elongated plate shape, and form two surfaces at both ends of the end plates 20a, 20b in a longitudinal direction indicated by an arrow B. Each of the side panels 30a to 30d is fixed to side surfaces of the end plates 20a, 20b using bolts 32. The present invention is not limited to the example where the cover 28 is made up of the four side panels 30a to 30d. The cover 28 may be formed integrally by casting. The coupling members 24a, 24b may be provided integrally with the cover 28. The cover 28 is provided as necessary. The cover 28 may not be provided.

Figure 3:
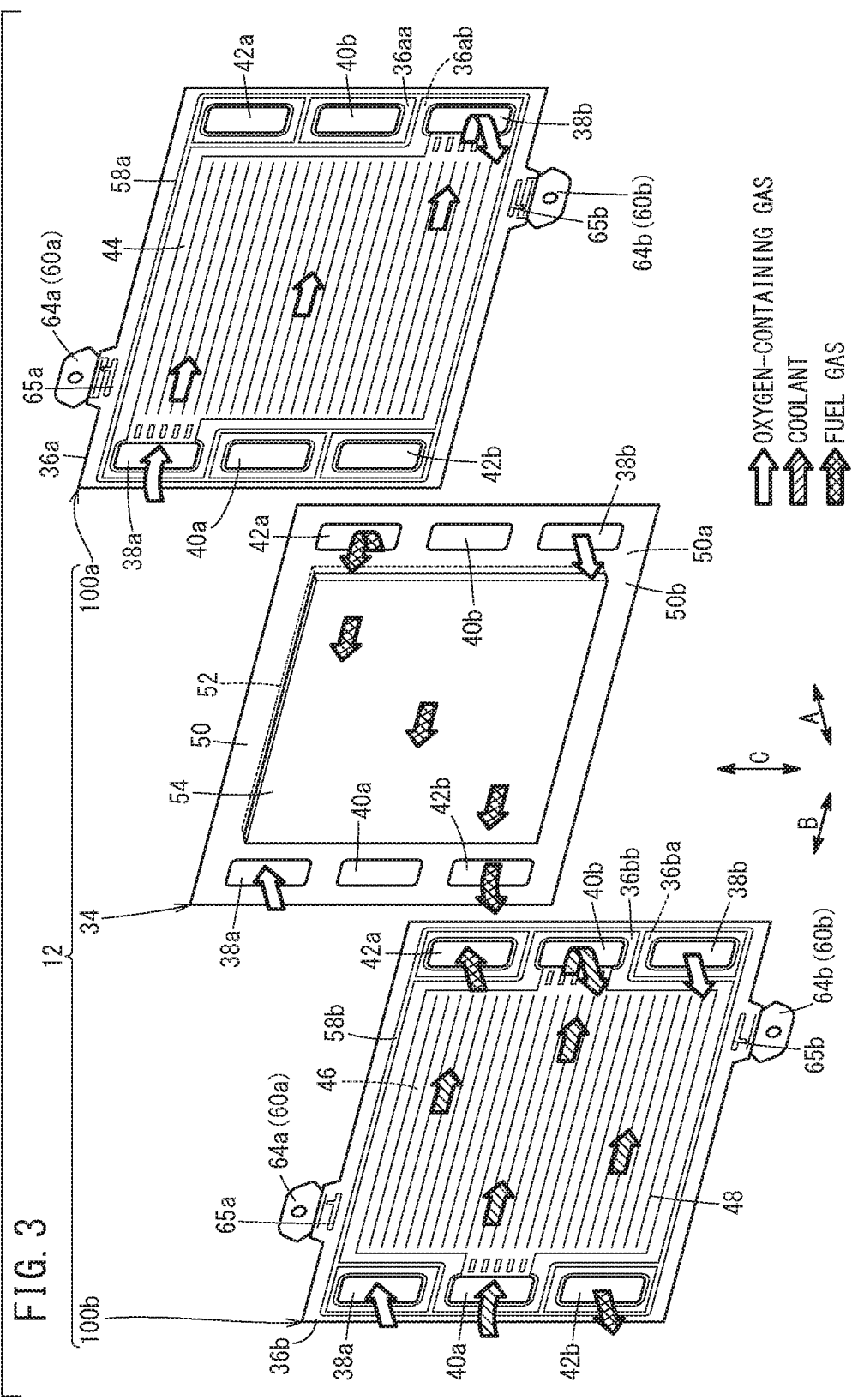
FIG. 3 is an exploded perspective view showing main components of the fuel cell stack in FIG. 1.
Figure 4:
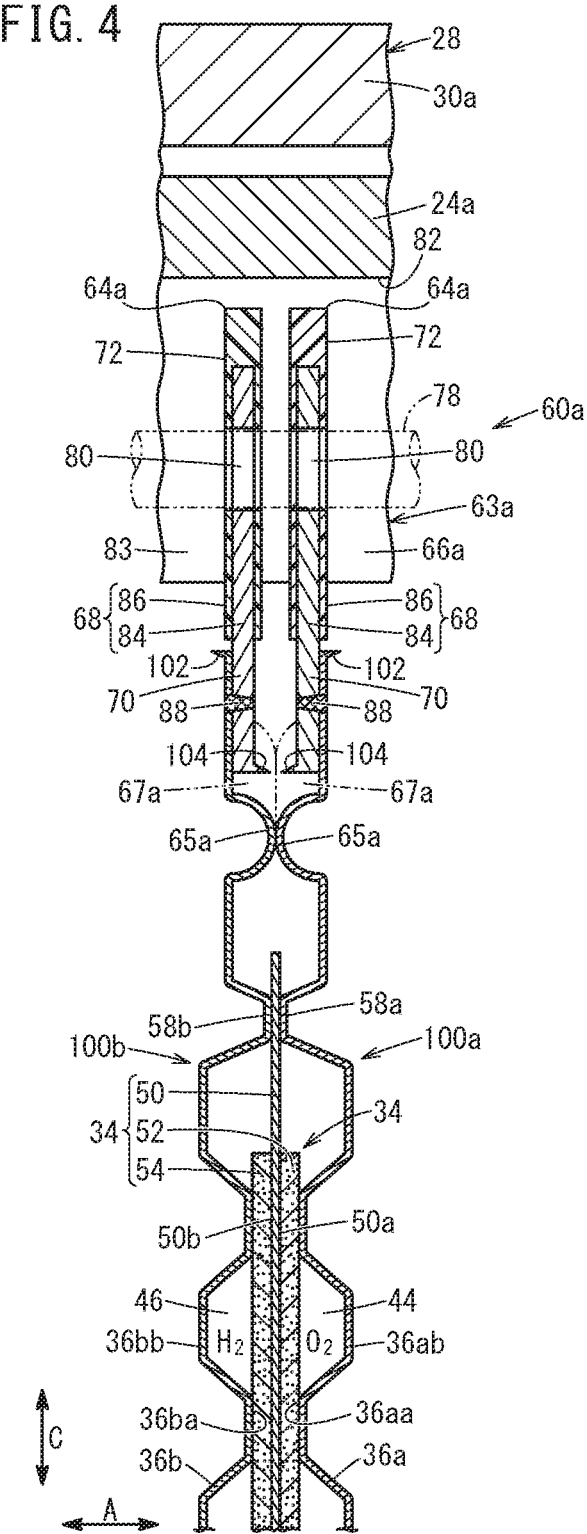
FIG. 4 is a cross sectional view taken along a line IV-IV in FIG. 2.

As shown in FIGS. 3 and 4, the unit cell 12 includes an MEA 34 (membrane electrode assembly) and a first separator 36a and a second separator 36b sandwiching the MEA 34.

In FIG. 3, at one end of the unit cell 12 in a long side direction indicated by an arrow B, an oxygen-containing gas supply passage 38a, a coolant supply passage 40a, and a fuel gas discharge passage 42b are provided. The oxygen-containing gas supply passage 38a, the coolant supply passage 40a, and the fuel gas discharge passage 42b extend through the unit cell 12 in the direction indicated by the arrow A. An oxygen-containing gas is supplied through the oxygen-containing gas supply passage 38a. A coolant is supplied through the coolant supply passage 40a. A fuel gas such as a hydrogen-containing gas is discharged through the fuel gas discharge passage 42b. The oxygen-containing gas supply passage 38a, the coolant supply passage 40a, and the fuel gas discharge passage 42b are arranged in the direction indicated by the arrow C.

At another end of the unit cell 12 in the direction indicated by the arrow B, a fuel gas supply passage 42a, a coolant discharge passage 40b, and an oxygen-containing gas discharge passage 38b are provided. The fuel gas supply passage 42a, the coolant discharge passage 40b, and the oxygen-containing gas discharge passage 38b extend through the unit cell 12 in the direction indicated by the arrow A. The fuel gas is supplied through the fuel gas supply passage 42a. The coolant is discharged through the coolant discharge passage 40b. The oxygen-containing gas is discharged through the oxygen-containing gas discharge passage 38b. The fuel gas supply passage 42a, the coolant discharge passage 40b, and the oxygen-containing gas discharge passage 38b are arranged in the direction indicated by the arrow C.

It should be noted that the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b are also formed in the end plate 20a, respectively (see FIG. 1). The layout of the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b is not limited to the layout of the embodiment of the present invention. The layout of the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b may be determined as necessary according to the required specification.

As shown in FIGS. 3 and 4, the first separator 36a has an oxygen-containing gas flow field 44 on its surface 36aa facing the MEA 34. The oxygen-containing gas flow field 44 is connected to the oxygen-containing gas supply passage 38a and the oxygen-containing gas discharge passage 38b. The oxygen-containing gas flow field 44 includes a plurality of oxygen-containing gas flow grooves extending in the direction indicated by the arrow B.

The second separator 36b has a fuel gas flow field 46 on its surface 36ba facing the MEA 34. The fuel gas flow field 46 is connected to the fuel gas supply passage 42a and the fuel gas discharge passage 42b. The fuel gas flow field 46 includes a plurality of fuel gas flow grooves extending in the direction indicated by the arrow A.

A coolant flow field 48 is formed on a surface 36ab of the first separator 36a and on a surface 36bb of the second separator 36b facing each other. A plurality of the coolant flow grooves extending in the direction indicated by the arrow B are formed in the coolant flow field 48.

For example, the MEA 34 includes a solid polymer electrolyte membrane 50 (cation ion exchange membrane) as a thin membrane of perfluorosulfonic acid impregnated with water, and a cathode 52 and an anode 54 sandwiching the solid polymer electrolyte membrane 50.

A fluorine based electrolyte may be used as the solid polymer electrolyte membrane 50. Alternatively, an HC (hydrocarbon) based electrolyte may be used as the solid polymer electrolyte membrane 50. The surface size (outer size) of the solid polymer electrolyte membrane 50 is larger than the surface size (outer size) of the cathode 52 and the surface size (outer size) of the anode 54. That is, the solid polymer electrolyte membrane 50 protrudes outward beyond the cathode 52 and the anode 54.

The cathode 52 is joined to a surface 50a of the solid polymer electrolyte membrane 50. The anode 54 is joined to a surface 50b of the solid polymer electrolyte membrane 50. Each of the cathode 52 and the anode 54 includes an electrode catalyst layer and a gas diffusion layer. For example, the electrode catalyst layer includes platinum alloy supported on porous carbon particles, and the carbon particles are deposited uniformly on the surface of the gas diffusion layer. The gas diffusion layer comprises a carbon paper, carbon cloth, etc.

It should be noted that, in the MEA 34, the surface size of the solid polymer electrolyte membrane 50 may be smaller than the surface size of the cathode 52 and the surface size of the anode 54, and a frame shaped resin film (resin frame member) may be sandwiched between an outer marginal portion of the cathode 52 and an outer marginal portion of the anode 54.

Each of the first separator 36a and the second separator 36b has a rectangular (quadrangle) shape. Each of the first separator 36a and the second separator 36b is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. In the state where the surface 36ab of the first separator 36a and the surface 36bb of the second separator 36b face each other, the outer ends of the first separator 36a and the second separator 36b are joined together by welding, brazing, crimping, etc.

A first seal line 58a is formed on the first separator 36a. The first seal line 58a is expanded toward the MEA 34. A protruding end surface of the first seal line 58a is a flat surface which contacts the surface 50a of the solid polymer electrolyte membrane 50 in an air-tight manner (see FIG. 4). It should be noted that the protruding end surface of the first seal line 58a may have a rounded shape. The first seal line 58a is formed around the outer peripheral portion of the first separator 36a, for preventing leakage of fluid (fuel gas, oxygen-containing gas, and coolant) to the outside, through a space between the first separator 36a and the MEA 34. That is, the protruding end surface of the first seal line 58a directly contacts the surface 50a of the solid polymer electrolyte membrane 50 and is deformed elastically for sealing, and thus, the first seal line 58a functions as a metal bead seal. The first seal line 58a may be an elastic rubber seal member.

A second seal line 58b is formed on the second separator 36b. The second seal line 58b is expanded toward the MEA 34. A protruding end surface of the second seal line 58b is a flat surface which contacts the surface 50b of the solid polymer electrolyte membrane 50 in an air-tight manner (see FIG. 4). It should be noted that the protruding end surface of the second seal line 58b may have a rounded shape. The second seal line 58b is formed around the outer peripheral portion of the second separator 36b, for preventing leakage of fluid (fuel gas, oxygen-containing gas, and coolant) to the outside, through a space between the second separator 36b and the MEA 34. That is, the protruding end surface of the second seal line 58b directly contacts the surface 50b of the solid polymer electrolyte membrane 50 and is deformed elastically for sealing, and thus, the second seal line 58b functions as a metal bead seal. The second seal line 58b may be an elastic rubber seal member.

As shown in FIGS. 2 and 3, the first separator 36a has load receiver structure 60a, 60b for receiving an external load (impact load) in a direction (indicated by an arrow B) perpendicular to the stacking direction of the unit cells 12.

Figure 5:
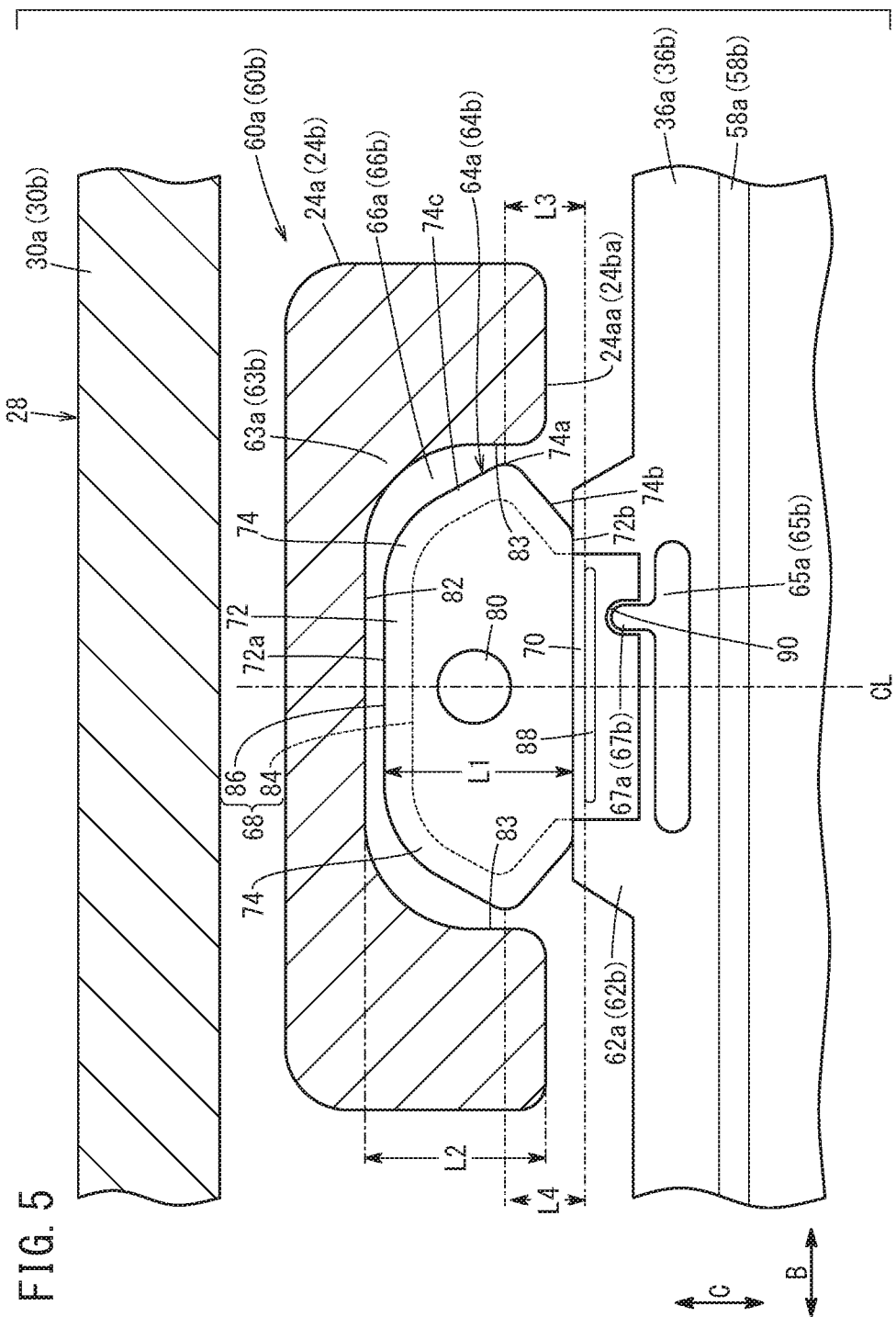
FIG. 5 is an enlarged view showing load receiver structure in FIG. 2.

As shown in FIG. 5, the load receiver structure 60a includes a support portion 62a, a contact portion 63a, a load receiver 64a, a rib 65a, and a projection 67a. The support portion 62a is formed integrally with the first separator 36a by press forming. One of long sides of the first separator 36a partially protrudes outward (in the direction indicated by the arrow C) to form the support portion 62a. The support portion 62a is shifted from the center to one end side of the one long side of the first separator 36a, in a manner that the support portion 62a faces the coupling member 24a (see FIGS. 2 and 3).

The contact portion 63a includes a recess 66a formed in a surface 24aa of the coupling member 24a which faces the unit cells 12. The recess 66*a* extends over the entire length of the coupling member 24*a* in the stacking direction of the unit cells 12 (see FIG. 1). The recess 66*a* is a substantially rectangular groove including rounded corners in lateral cross section.

The load receiver 64*a* is in the form of a plate, and provided in the support portion 62*a*. The load receiver 64*a* is asymmetrical about a central line CL passing through the center of the load receiver 64*a* in the width direction (indicated by the arrow B) and extending in the protruding direction (indicated by the arrow C) of the load receiver 64*a* in which the load receiver 64*a* protrudes from the outer peripheral portion of the first separator 36*a*.

The load receiver 64*a* includes a protrusion 68 protruding outward from the support portion 62*a* in the direction indicated by the arrow C, and an attachment portion 70 provided integrally with the protrusion 68, and joined to the support portion 62*a*. The protrusion 68 is symmetrical about the central line CL. The protrusion 68 includes a protrusion body 72 positioned at the center in the width direction (indicated by the arrow B) of the protrusion 68, and a pair of expansions 74 expanded from both ends of the protrusion body 72 in the width direction toward both sides in the width direction.

A positioning hole 80 is formed at the center of the protrusion body 72, for inserting a rod 78 into the positioning hole 80 to position each of the unit cells 12 at the time of producing the fuel cell stack 10 (see FIG. 4). After completion of positioning each of the unit cells 12, the rod 78 may be detached from the positioning hole 80 or the rod 78 may be left inside the positioning hole 80.

A protruding end 72*a* of the protrusion body 72 in the direction indicated by the arrow C faces a bottom surface 82 of the recess 66*a* through a gap. Each of the expansions 74 has a substantially triangular shape. Specifically, each of the expansions 74 includes a top portion 74*a* positioned most remotely from the protrusion body 72 in the direction indicated by the arrow B, a first inclined portion 74*b* inclined straight from a root 72*b* of the protrusion body 72 to the top portion 74*a*, in a direction away from the support portion 62*a*, and a second inclined portion 74*c* inclined straight from the protruding end 72*a* to the top portion 74*a* of the protrusion body 72, in a direction toward the support portion 62*a*.

The top portion 74*a* has a circular arc shape. The top portion 74*a* is positioned on a side closer to the support portion 62*a* from the center of the positioning hole 80. That is, the top portion 74*a* is positioned on a side closer to the support portion 62*a* from the center of the protrusion body 72 in the direction indicated by the arrow C. The protruding length L1 of the protrusion 68 in the direction indicated by the arrow C (distance from the support portion 62*a* to the protruding end 72*a* of the protrusion 68) is larger than the depth L2 of the recess 66*a* in the direction indicated by the arrow C. Therefore, the root 72*b* of the protrusion 68 is exposed to the outside of the recess 66*a* (the root 72*b* is not inserted into the recess 66*a*). In the structure, the support portion 62*a* is not brought into contact with the contact portion 63*a* in the direction indicated by the arrow C significantly. In the state where no external load is applied to the fuel cell stack 10, the top portion 74*a* is spaced from a side surface 83 of the recess 66*a*.

The protrusion 68 includes a base portion 84 forming the outer shape of the protrusion 68, and an insulating part 86 covering the outer surface of the base portion 84. The base portion 84 and the attachment portion 70 are formed integrally by press forming of a single metal plate. Examples of the material of the base portion 84 and the attachment portion 70 include those of the first separator 36*a* and the second separator 36*b*. The insulating part 86 interrupts electrical connection between the base portion 84 and the coupling member 24*a*.

Figure 6:
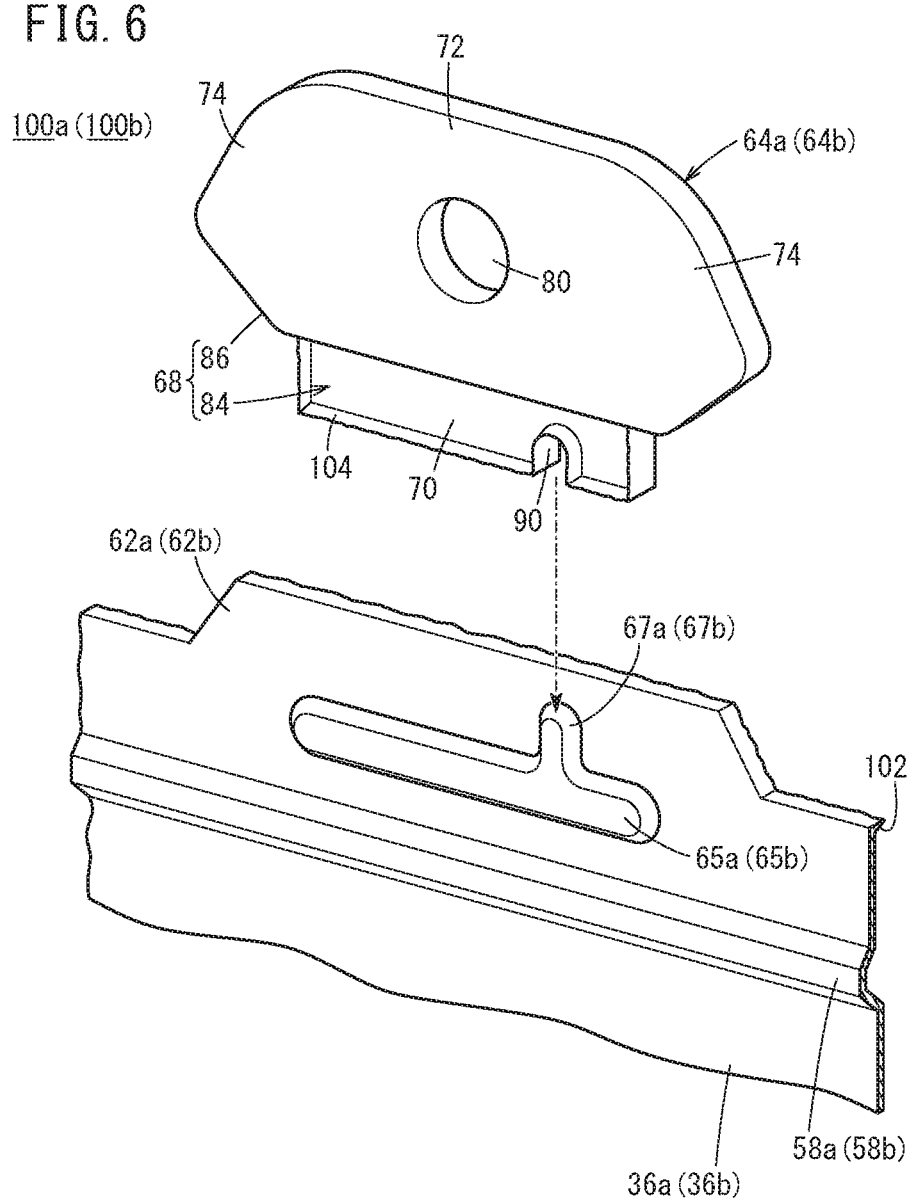
FIG. 6 is a view showing a method of producing a fuel cell separator member shown in FIG. 5.

The attachment portion 70 is asymmetrical about the central line CL. The attachment portion 70 has a substantially rectangular shape, and extends in the direction indicated by the arrow B. The attachment portion 70 is provided at the center of the support portion 62*a* in the direction indicated by the arrow B. As shown in FIG. 6, burrs 102 are formed in the first separator 36*a* at the time of press forming, and protrude in a direction opposite to the load receiver 64*a*. Also, burrs 104 are formed in the attachment portion 70, and protrude in a direction opposite to the first separator 36*a*.

In the state where the attachment portion 70 is overlapped with a surface of the support portion 62*a*, the attachment portion 70 and the support portion 62*a* are joined together by welding, brazing, etc. Stated otherwise, the attachment portion 70 is joined to the first separator 36*a* (support portion 62*a*) at a position overlapped with the first separator 36*a* (support portion 62*a*) in the stacking direction. A joint portion 88 (welding bead) joins the attachment portion 70 and the support portion 62*a* together, and the joint portion 88 extends in the longitudinal direction of the attachment portion 70 (in the direction indicated by the arrow B). That is, the joint portion 88 extends in the width direction of the load receiver 64*a*.

The distance L3 between the joint portion 88 as a fulcrum point provided in the first separator 36*a* in the load receiver 64*a* and the top portion 74*a* of one of the expansions 74 in the protruding direction is the same as the distance L4 between the joint portion 88 and the top portion 74*a* of the other expansion 74 in the protruding direction.

A cutout 90 as a first engagement portion is formed in the attachment portion 70, at a position shifted from the central line CL toward one side in the width direction (indicated by the arrow B). The cutout 90 extends straight in the direction indicated by the arrow C from a side (long side) opposite to the protrusion 68 of the attachment portion 70, toward the protrusion 68 up to a point before the joint portion 88. The protruding end of the cutout 90 (end adjacent to the protrusion 68) has a semi-circular (circular arc) shape.

The rib 65*a* and the projection 67*a* are provided integrally with the first separator 36*a* by press forming. The first separator 36*a* partially protrudes in the stacking direction to form the rib 65*a* and the projection 67*a*. The rib 65*a* is positioned adjacent to the joint portion 88, and the rib 65*a* extends in the width direction of the protrusion 68 of the load receiver 64*a* indicated by the arrow B. The rib 65*a* protrudes in a circular arc shape, toward a position where the surface 36*aa* of the first separator 36*a* contacts the MEA 34. It should be noted that the protruding end of the rib 65*a* may have a flat shape. As shown in FIG. 4, the protruding end of the rib 65*a* contacts the protruding end of the rib 65*a* of the load receiver structure 60*a* provided in the second separator 36*b*. The center in the direction in which the rib 65*a* extends indicated by the arrow B is positioned on the central line CL of the load receiver 64*a*.

The projection 67*a* extends straight in the direction indicated by the arrow C toward the attachment portion 70, from a position shifted from the center of the rib 65*a* toward one side in the direction indicated by the arrow B. In the state where the load receiver 64*a* is joined to the first separator 36*a*, the projection 67*a* functions as a second engagement portion inserted into the cutout 90. It should be noted that no projection is formed at the position which is symmetrical with the projection 67a about the central line CL of the first separator 36a.

The protruding length in the direction indicated by the arrow A of the projection 67a is the same as the protruding length of the rib 65a in the direction indicated by the arrow A. Therefore, the protruding end of the projection 67a in the direction indicated by the arrow A contacts the protruding end of the projection 67a of the load receiver structure 60a provided in the second separator 36b. The protruding end of the projection 67a in the direction indicated by the arrow C has a semi-circular (circular arc) shape.

As shown in FIGS. 2 and 3, the load receiver structure 60b includes a support portion 62b, a contact portion 63b, a load receiver 64b, a rib 65b, and a projection 67b. The support portion 62b is provided integrally with the first separator 36a by press forming. The other long side of the first separator 36a partially protrudes outward (in the direction indicated by the arrow C) to form the support portion 62b. The support portion 62b is shifted from the center of the other long side of the first separator 36a toward the other end side in a manner that the support portion 62b faces the coupling member 24b.

The contact portion 63b includes a recess 66b formed in a surface 24ba of the coupling member 24b facing the unit cells 12. The recess 66b extends over the entire length of the coupling member 24b in the stacking direction of the unit cells 12. The recess 66b is a groove having a substantially rectangular shape in lateral cross section, and has the same structure as that of the recess 66a described above.

In the embodiment of the present invention, the load receiver 64b is provided for the support portion 62b. The load receiver 64b has the same structure as the load receiver 64a described above (structure obtained by inverting the load receiver 64a upside down). Therefore, the detailed description of the load receiver 64b is omitted.

The load receiver 64a and the load receiver 64b are positioned point symmetrically with each other about the center of the surface of the first separator 36a. However, it should be noted that the load receiver 64a and the load receiver 64b may not be positioned point symmetrically with each other.

The rib 65b and the projection 67b have the same structure as the rib 65a and the projection 67a as described above. The protruding ends of the rib 65b and the projection 67b contact the protruding ends of the rib 65b and the projection 67b of the load receiver structure 60b provided in the second separator 36b.

As in the case of the first separator 36a, the second separator 36b has the load receiver structure 60a, 60b for receiving an external load (impact load) applied to the unit cells 12 in the direction indicated by the arrow B. The load receiver structure 60a, 60b of the second separator 36b has the same structure as the load receiver structure 60a, 60b of the first separator 36a, and thus, the detailed description thereof is omitted (see the description of the load receiver structure 60a, 60b of the first separator 36a described above).

Next, operation of the fuel cell stack 10 having the above structure will be described.

Firstly, as shown in FIG. 1, the oxygen-containing gas such as air is supplied to the oxygen-containing gas supply passage 38a of the end plate 20a. The fuel gas such as the hydrogen-containing gas is supplied to the fuel gas supply passage 42a of the end plate 20a. Coolant such as pure water, ethylene glycol or oil is supplied to the coolant supply passage 40a of the end plate 20a.

As shown in FIG. 3, the oxygen-containing gas flows from the oxygen-containing gas supply passage 38a into the oxygen-containing gas flow field 44 of the first separator 36a. The oxygen-containing gas flows along the oxygen-containing gas flow field 44 in the direction indicated by the arrow B, and the oxygen-containing gas is supplied to the cathode 52 of the membrane electrode assembly.

In the meanwhile, the fuel gas flows from the fuel gas supply passage 42a to the fuel gas flow field 46 of the second separator 36b. The fuel gas flows along the fuel gas flow field 46 in the direction indicated by the arrow B, and the fuel gas is supplied to the anode 54 of the membrane electrode assembly.

Thus, in each of the MEAs 34, the oxygen-containing gas supplied to the cathode 52 and the fuel gas supplied to the anode 54 are partially consumed in the electrochemical reactions to perform power generation.

Then, after the oxygen-containing gas supplied to the cathode 52 is partially consumed at the cathode 52, the oxygen-containing gas is discharged along the oxygen-containing gas discharge passage 38b in the direction indicated by the arrow A. Likewise, after the fuel gas supplied to the anode 54 is partially consumed at the anode 54, the partially consumed fuel gas is discharged along the fuel gas discharge passage 42b in the direction indicated by the arrow A.

Further, after the coolant supplied to the coolant supply passage 40a flows into the coolant flow field 48 formed between the first separator 36a and the second separator 36b, the coolant flows in the direction indicated by the arrow B. After the coolant cools the MEA 34, the coolant is discharged from the coolant discharge passage 40b.

Figure 7:
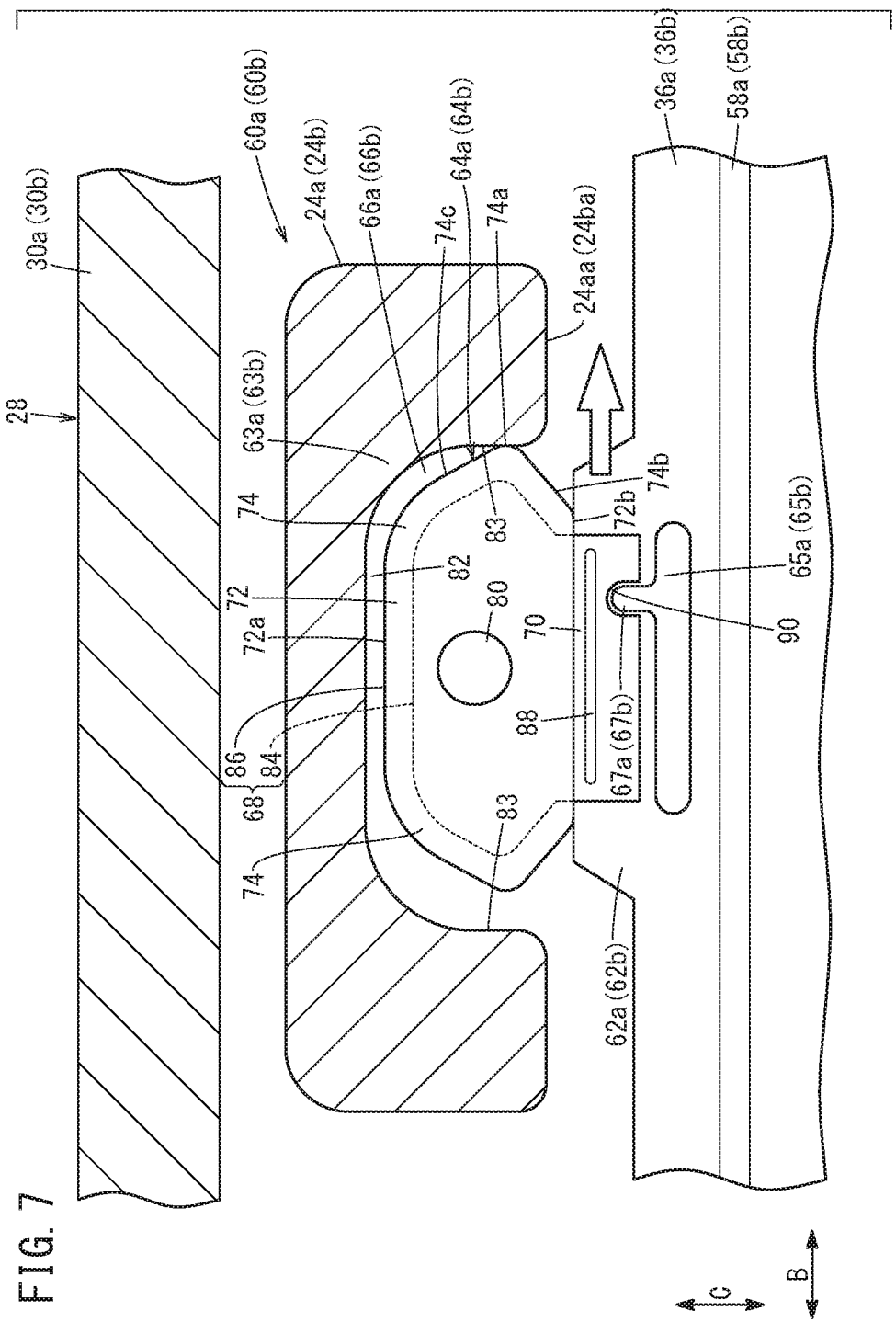
FIG. 7 is an enlarged view showing operation of the load receiver in FIG. 5.

In the fuel cell stack 10 according to the embodiment of the present invention, when an inertial force is applied to the stack body 14, as shown in FIG. 7, the load receivers 64a, 64b contact the contact portions 63a, 63b. Thus, the fuel cell stack 10 can receive the load in the direction (direction indicated by the arrow B) perpendicular to the stacking direction of the unit cells 12.

In the embodiment of the present invention, the load receivers 64a, 64b are joined to the support portions 62a, 62b formed in the first separator 36a to form the fuel cell separator member (hereinafter referred to as the "separator member 100a"). Further, the load receivers 64a, 64b are joined to the support portions 62a, 62b formed in the second separator 36b to form the fuel cell separator member (hereinafter referred to as the "separator member 100b").

Next, a method of producing the separator member 100a will be described. The method of producing the separator member 100b is the same as the method of producing the separator member 100a, and thus, description thereof is omitted.

Firstly, the first separator 36a is produced by press forming of a metal plate. The oxygen-containing gas supply passage 38a, the oxygen-containing gas discharge passage 38b, the fuel gas supply passage 42a, the fuel gas discharge passage 42b, the coolant supply passage 40a, the coolant discharge passage 40b, the first seal line 58a, the support portions 62a, 62b, the ribs 65a, 65b, and the projections 67a, 67b are formed in the first separator 36a by this press forming. At this time, burrs 102 are formed at the marginal portion of one surface (surface) of the first separator 36a (see FIGS. 4 and 6).

Further, the base portion 84 is formed by press forming of the metal plate. The base portion 84 is partially covered by the insulating part 86 to produce the load receivers 64a, 64b.

At this time, burrs 104 are formed at the marginal portion of one surface of the base portion 84 (see FIGS. 4 and 6).

Further, the load receiver 64a is positioned on the support portion 62a of the first separator 36a in a manner that the projection 67a of the first separator 36a is inserted into the cutout 90 of the load receiver 64a. At this time, in the case where the surface of the load receiver 64a having no burrs 104 is overlapped with the surface of the first separator 36a having no burrs 102 (in the case where the front/back surfaces of the load receiver 64a are oriented correctly), the projection 67a is inserted into the cutout 90. In contrast, in the case where the surface of the load receiver 64a having the burrs 104 is overlapped with the surface of the first separator 36a having no burrs 102 (in the case where the front/back surfaces of the load receiver 64a are oriented incorrectly), the projection 67a is not inserted into the cutout 90. Then, after the load receiver 64a is positioned on the first separator 36a, the attachment portion 70 and the support portion 62a are joined together.

Thereafter, as in the case of the load receiver 64a, after the load receiver 64b is positioned on the support portion 62b of the first separator 36a, the load receiver 64b and the support portion 62b are joined together. By the above process, the separator member 100a is produced.

The embodiment of the present invention has the following advantages. Hereinafter, though the description will be given mainly in connection with the separator member 100a, also in the separator member 100b, the same advantages are obtained.

The separator member 100a includes the first separator 36a forming the unit cell 12 of the fuel cell stack 10, and the load receiver 64a in a form of a plate joined to the first separator 36a in a manner that the load receiver 64a protrudes outward from the outer peripheral portion of the first separator 36a.

The load receiver 64a is formed asymmetrically about a central line CL passing through the center of the load receiver 64a in the width direction and extending in the protruding direction of the load receiver 64a. Thus, in the case where the load receiver 64a is formed by press forming, it is possible to easily recognize whether or not the surface of the load receiver 64a having no burrs 104 contacts the surface of the first separator 36a having no burrs 102 (whether or not the front/back surfaces of the load receiver 64a are oriented correctly). Therefore, it is possible to easily prevent erroneous assembling of the load receiver 64a to the first separator 36a.

In the load receiver 64a, the cutout 90 is formed at a position shifted from the central line CL toward one side in the width direction, and the projection 67a is provided in the first separator 36a. In the state where the load receiver 64a is joined to the first separator 36a, the projection 67a is inserted into the cutout 90.

Therefore, at the time of positioning the load receiver 64a on the first separator 36a, it is possible to easily confirm whether or not the front/back surfaces of the load receiver 64a are oriented correctly, based on whether or not the projection 67a is inserted into the cutout 90.

The rib 65a protruding in the stacking direction is provided in the first separator 36a, adjacent to the joint portion 88 between the load receiver 64a and the first separator 36a, and the projection 67a extends from the rib 65a. In the structure, since it is possible to improve the rigidity of the first separator 36a in the part adjacent to the joint portion 88, by the rib 65a and the projection 67a, the load receiver 64a does not significantly tilt in the stacking direction with respect to the first separator 36a.

The protrusion 68 of the load receiver 64a protruding outward from the outer peripheral portion of the first separator 36a is formed symmetrically about the central line CL. Therefore, it is possible to simplify the structure of the protrusion 68.

The present invention is not limited to the above structure. The fuel cell stack 10 may include separator members 100aa, 100ba according to a modified embodiment. In the description of the separator members 100aa, 100ba, the constituent elements of the separator members 100aa, 100ba that are identical to those of the above described separator members 100a, 100b are labeled with the same reference numerals, and detailed description thereof is omitted. Further, the separator member 100ba has the same structure as the separator member 100aa, and thus, detailed description thereof is omitted.

As shown in FIGS. 8A and 8B, the separator member 100aa include a first separator 130a, a load receiver 64aa joined to a support portion 62a of the first separator 130a, and a load receiver 64ba joined to a support portion 62b of the first separator 130a.

The load receiver 64aa includes the protrusion 68 and an attachment portion 110 formed asymmetrically about the central line CL. A first hole 112 (through hole) is formed in the attachment portion 110 at a position shifted from the central line CL toward one side in the width direction (indicated by the arrow B). The first hole 112 is formed adjacent to the joint portion 88 (position slightly shifted from the joint portion 88 toward a position where the rib 65a is present). The load receiver 64aa has the same structure as the load receiver 64a.

In the state where the load receiver 64aa is joined to the first separator 130a, a second hole 114 (through hole) connected to the first hole 112 is formed in the support portion 62a of the first separator 130a. In the first separator 130a, no hole is formed at the position symmetrical with the second hole 114 about the central line CL. The load receiver 64ba has the same structure as the load receiver 64aa.

The separator member 100ba includes a second separator 130b, a load receiver 64aa joined to the support portion 62a of the second separator 130b, and a load receiver 64ba joined to the support portion 62b of the second separator 130b. The second separator 130b has the same structure as the first separator 130a.

Next, a method of producing the separator member 100aa will be described below.

Firstly, the first separator 130a having the second hole 114 and the load receiver 64aa having the first hole 112 are formed by press forming. Further, the load receiver 64aa is positioned on the support portion 62a of the first separator 130a in a manner that the first hole 112 of the load receiver 64aa and the second hole 114 of the first separator 130a are connected together. In this regard, in the case where the surface of the load receiver 64aa having no burrs 104 is overlapped, and brought in contact with the surface of the first separator 130a having no burrs 102 (in the case where the front and back surfaces of the load receiver 64aa are oriented correctly), the first hole 112 and the second hole 114 are connected together. In contrast, in the case where the surface of the load receiver 64aa having the burrs 104 is overlapped, and brought in contact with the surface of the first separator 130a having no burrs 102 (in the case where the front and back surfaces of the load receiver 64aa are oriented incorrectly), the first hole 112 and the second hole 114 are not connected together.

Figure 9:
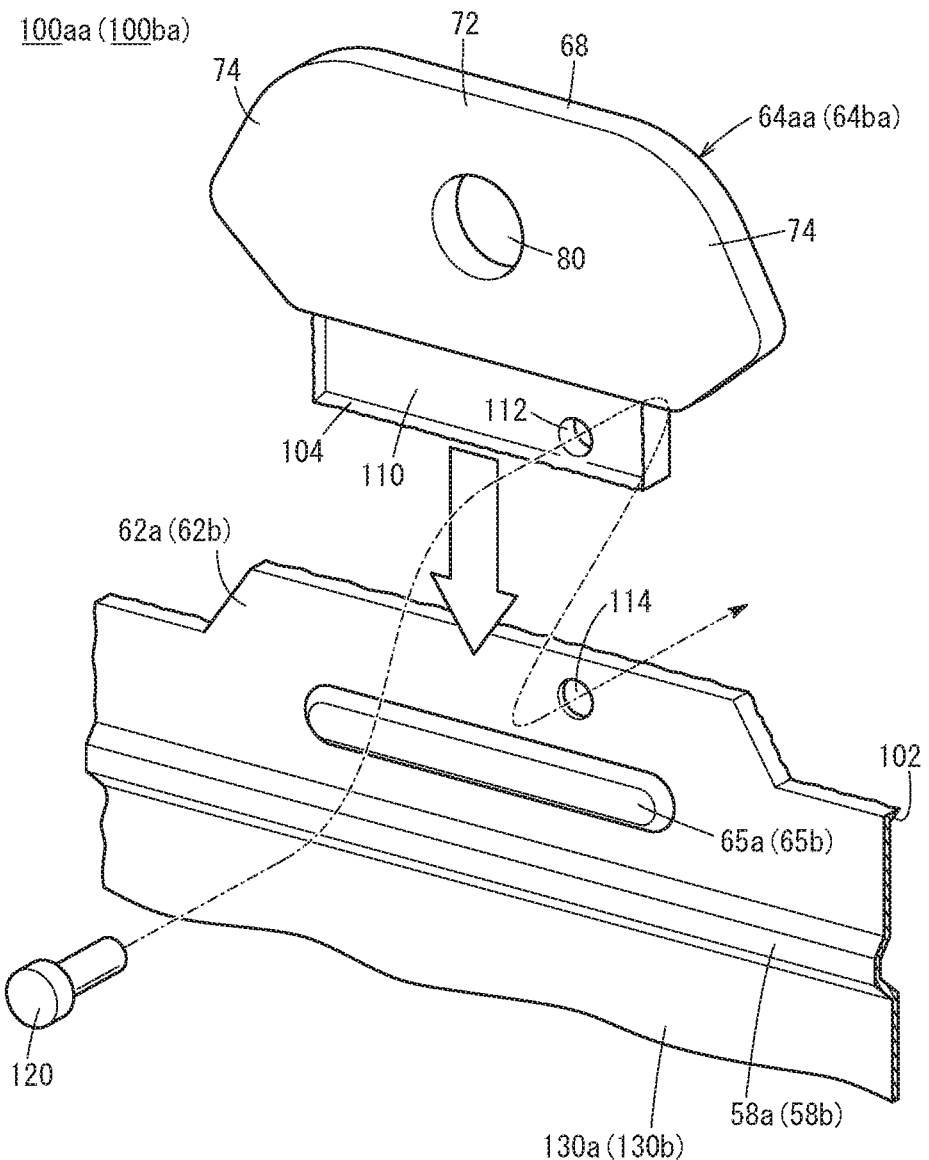
FIG. 9 is a view showing a method of producing the fuel cell separator member shown in FIG. 8A.

Further, as shown in FIGS. 8B and 9, a pin member 120 for checking positional alignment is inserted into the first hole 112 and the second hole 114 to make sure that the front and back surfaces of the load receiver 64aa positioned to the first separator 130a are oriented correctly. In this regard, in the case where the front and back surfaces of the load receiver 64aa are oriented incorrectly, since the first hole 112 and the second hole 114 are not connected together, it is not possible to insert the pin member 120 into the first hole 112 and the second hole 114. In this case, it may be possible to check that the first hold 112 and the second hole 114 are not connected together based on whether light is transmitted from the first hole 112 to the second hole 114. When the above check is finished, the pin member 120 is detached from the first hole 112 and the second hole 114. Further, after the load receiver 64aa is positioned on the first separator 130a, the attachment portion 110 and the support portion 62a are joined together.

Thereafter, in the same manner as in the case of the load receiver 64aa, after the load receiver 64ba is positioned on the support portion 62b of the first separator 130a, the load receiver 64ba and the support portion 62b are joined together. By the above process, the separator member 100aa is produced.

In the separator member 100aa according to the modified embodiment, the first hole 112 is formed in the load receiver 64aa, at the position shifted from the central line CL toward one side in the width direction, and the second hole 114 is formed in the first separator 130a. In the state where the load receiver 64aa is joined to the first separator 130a, the second hole 114 is connected to the first hole 112.

In the structure, when the load receiver 64aa is positioned on the first separator 130a, it is possible to easily check whether the front and back surfaces of the load receiver 64aa are oriented correctly, based on whether the first hole 112 and the second hole 114 are connected together.

In the present invention, in the separator members 100a, 100b, the protrusion 68 may be formed asymmetrically about the central line CL, and the cutout 90 and the projections 67a, 67b may be omitted. Further, in the separator members 100aa, 100ba, the protrusion 68 may be formed asymmetrically about the central line CL, and the first hole 112 and the second hole 114 may be omitted. In this manner, by observing the shape of the protrusion 68 at the time of positioning the protrusion 68 on the first separators 36a, 130a, it becomes possible to check whether the front and back surfaces of the load receivers 64a, 64b, 64aa, 64ba are oriented correctly.

In this case, for example, in each expansion 74, by forming the rounded shape of the border portion between the second inclined portion 74c and the top portion 74a of the expansion 74 to have a different size, it is possible to form the protrusion 68 asymmetrically about the central line CL. Further, in each expansion 74, by forming the rounded shape of the end of the first inclined portion 74b of the expansion 74 adjacent to the root 72b to have a different size, it is possible to form the protrusion 68 asymmetrically about the central line CL. The structure of the protrusion 68 is not limited as long as the protrusion 68 has an asymmetrical shape.

The load receivers 64a, 64b, 64aa, 64ba may be provided at central positions of the long sides of the first separators 36a, 130a, and the second separators 36b, 130b. Further, two or more load receivers 64a, 64b, 64aa, 64ba may be provided in each of the long sides of the first separators 36a, 130a, and the second separators 36b, 130b. Further, the load receivers 64a, 64b may be provided in only one of the first separator 36a and the second separator 36b, and the load receivers 64aa, 64ba may be provided in only one of the first separator 130a and the second separator 130b.

The fuel cell separator member and the fuel cell stack according to the present invention are not limited to the above described embodiments. It is a matter of course that various structures may be adopted without departing from the gist of the present invention.

What is claimed is:

1. A fuel cell separator member comprising:
   a separator forming a unit cell of a fuel cell stack;
   a load receiver in a form of a plate joined to the separator, the load receiver protruding outward from an outer peripheral portion of the separator,
   wherein a width direction of the load receiver is a direction perpendicular to a protruding direction of the load receiver in which the load receiver protrudes from the outer peripheral portion of the separator and perpendicular to a stacking direction,
   the load receiver includes a protrusion protruding outward from the outer peripheral portion of the separator, and an attachment portion provided integrally with the protrusion and joined to the separator at a position overlapped with the separator in the stacking direction, and
   the attachment portion is formed asymmetrically about a central line passing through a center of the load receiver in the width direction and extending in the protruding direction of the load receiver.

2. The fuel cell separator member according to claim 1, wherein a first hole is formed in the load receiver, at a position shifted from the central line toward one side in the width direction; and
   a second hole is formed in the separator, and the second hole is configured to be connected to the first hole in a state where the load receiver is joined to the separator.

3. The fuel cell separator member according to claim 1, wherein a first engagement portion is provided in the load receiver at a position shifted from the central line toward one side in the width direction, and
   a second engagement portion is provided in the separator, and the second engagement portion is configured to be engaged with the first engagement portion in a state where the load receiver is joined to the separator.

4. The fuel cell separator member according to claim 3, wherein the first engagement portion is a cutout, and
   the second engagement portion is a projection inserted into the cutout.

5. The fuel cell separator member according to claim 4, wherein a rib protruding in the stacking direction is provided in the separator, adjacent to a joint portion between the load receiver and the separator, and
   the projection extends from the rib.

6. The fuel cell separator member according to claim 5, wherein the joint portion extends in the width direction, and the rib extends along the joint portion.

7. The fuel cell separator member according to claim 4, wherein the cutout is provided in the attachment portion.

8. The fuel cell separator member according to claim 7, wherein an outer periphery of the separator partially protrudes outward to form a support portion, and the attachment portion is joined to the support portion.

9. The fuel cell separator member according to claim 1, wherein the protrusion is formed symmetrically about the central line.

10. The fuel cell separator member according to claim 1, wherein a burr protruding on a side opposite from the separator is formed in the load receiver.

11. A fuel cell stack comprising a plurality of unit cells stacked in a stacking direction, each including a fuel cell separator member, the fuel cell separator member including:
- a separator forming the unit cell of the fuel cell stack;
- a load receiver in a form of a plate joined to the separator, the load receiver protruding outward from an outer peripheral portion of the separator,
- wherein a width direction of the load receiver is a direction perpendicular to a protruding direction of the load receiver in which the load receiver protrudes from the outer peripheral portion of the separator and perpendicular to a stacking direction,
- the load receiver includes a protrusion protruding outward from the outer peripheral portion of the separator, and an attachment portion provided integrally with the protrusion and joined to the separator at a position overlapped with the separator in the stacking direction, and
- the attachment portion is formed asymmetrically about a central line passing through a center of the load receiver in the width direction and extending in the protruding direction of the load receiver.

* * * * *